: US 10,696,487 B1
(45) Date of Patent: Jun. 30, 2020

(54) PALLET CONVEYING APPARATUS AND PALLET CONVEYING METHOD

(71) Applicant: NITTOKU ENGINEERING CO., LTD., Saitama-shi, Saitama (JP)

(72) Inventor: Kenta Hasegawa, Osaka (JP)

(73) Assignee: NITTOKU CO., LTD., Saitama, Saitama (JP)

( * ) Notice: Subject to any disclaimer, the term of this patent is extended or adjusted under 35 U.S.C. 154(b) by 0 days.

(21) Appl. No.: 16/463,611

(22) PCT Filed: Jan. 4, 2018

(86) PCT No.: PCT/JP2018/000027
§ 371 (c)(1),
(2) Date: May 23, 2019

(87) PCT Pub. No.: WO2018/135308
PCT Pub. Date: Jul. 26, 2018

(30) Foreign Application Priority Data

Jan. 17, 2017 (JP) ................................ 2017-005724

(51) Int. Cl.
*B65G 35/06* (2006.01)
*B65G 15/42* (2006.01)
*B65G 17/00* (2006.01)
*B65G 15/02* (2006.01)

(52) U.S. Cl.
CPC ............. *B65G 35/06* (2013.01); *B65G 15/02* (2013.01); *B65G 15/42* (2013.01); *B65G 17/002* (2013.01); *B65G 2201/0267* (2013.01)

(58) Field of Classification Search
CPC ........ B65G 37/00; B65G 47/52; B65G 35/06; B65G 17/18; B65G 47/5145; B65G 15/42; B65G 17/002; B65G 15/02; B65G 2201/0267
USPC ........................ 198/606, 465.1, 465.2, 580
See application file for complete search history.

(56) References Cited

U.S. PATENT DOCUMENTS

| | | | | |
|---|---|---|---|---|
| 3,771,258 A | * | 11/1973 | Charney | A01G 31/042 47/65 |
| 4,474,286 A | * | 10/1984 | Alexander | B65G 19/02 104/25 |
| 4,479,572 A | * | 10/1984 | Merz | B65G 13/02 198/345.3 |
| 5,884,753 A | * | 3/1999 | Robertson | B65G 15/02 198/803.2 |
| 10,399,788 B2 | * | 9/2019 | Suzuki | B23Q 7/1447 |
| 2008/0264799 A1 | * | 10/2008 | Seelmann-Eggebert | C25C 1/00 205/351 |
| 2010/0147183 A1 | * | 6/2010 | Weissbrodt | B61J 1/02 104/307 |

(Continued)

FOREIGN PATENT DOCUMENTS

JP 2011093032 A 5/2011
JP 2016117117 A 6/2016

*Primary Examiner* — James R Bidwell
(74) *Attorney, Agent, or Firm* — Rabin & Berdo, P.C.

(57) ABSTRACT

A pallet conveying apparatus includes a pair of straight rails configured such that a pallet is movably mounted thereon, a pallet linear feeding unit configured to convey the pallet mounted on the straight rails, a pair of curved rails provided in a curved manner to couple both end parts of the pair of straight rails, and a pallet curved feeding unit configured to convey the pallet mounted on the curved rails.

7 Claims, 14 Drawing Sheets

(56) References Cited

U.S. PATENT DOCUMENTS

2011/0100783 A1    5/2011   Baba
2015/0114799 A1*   4/2015   Hansl .................. B65G 1/1378
                                                     198/601
2018/0075506 A1*   3/2018   Burkhard ........... G06Q 30/0635

* cited by examiner

PALLET CONVEYING APPARATUS AND PALLET CONVEYING METHOD

TECHNICAL FIELD

The present invention relates to a pallet conveying apparatus and a pallet conveying method for conveying one, two or more pallets, on which works are placed, on a predetermined path.

BACKGROUND ART

A pallet conveying apparatus for conveying one, two or more pallets, on which works are placed, in a circulating manner with respect to machine tools is known. A pallet conveying apparatus disclosed in JP2011-93032A includes a back pallet rail and a front pallet rail extending parallel to each other and pallet moving means for moving a pallet from the back pallet rail to the front pallet rail or from the front pallet rail to the back pallet rail by moving between two positions facing both end parts of the back pallet rail and the front pallet rail. This pallet conveying apparatus can convey a plurality of pallets on a rectangular path.

A work placed on the pallet is processed by machine tools provided around the pallet conveying apparatus. To facilitate work processings by the machine tools, the work preferably passes near the machine tools. To that end, the pallet is so configured that the work is placed on one side of the pallet. Since the pallets are conveyed on the rectangular path in the pallet conveying apparatus disclosed in JP2011-93032A, if the machine tools are provided along the front pallet rail, other machine tools for processing the works placed on the pallets mounted on the back pallet rail have to be provided between the front pallet rail and the back pallet rail. In this case, since an interval between the front pallet rail and the back pallet rail increases, it is substantially impossible to provide the machine tools along the back pallet rail.

JP2016-117117A discloses a pallet conveying apparatus with two straight rails parallel to each other at a predetermined distance from each other and pallet moving means for guiding a plurality of pallets, on which works are placed, from an end part of either one of the straight rails to an end part of the other straight rail by moving the pallets along an arcuate path.

The pallet moving means in the pallet conveying apparatus disclosed in JP2016-117117A includes an elevating rotary plate rotatable about a vertical axis and vertically movable, one, two or more short rails provided around the elevating rotary plate, and an index unit for elevating and lowering the elevating rotary plate and rotating the elevated elevating rotary plate. The one, two or more short rails are configured such that the pallets are mountable thereon, and continuous with the straight rails with the elevating rotary plate lowered. The index unit elevates and lowers and rotates the elevating rotary plate at a first position where the short rails are continuous with one straight rail and a second position where the short rails are continuous with the other straight rail.

In the pallet conveying apparatus disclosed in JP2016-117117A, the pallets can be circulated on the track-like path. If the pallets are conveyed on the track-like path, one side of each pallet can be constantly caused to face outward. Thus, machine tools can be arranged outside the two straight rails and works placed on the pallets respectively mounted on the two straight rails can be processed.

SUMMARY OF INVENTION

It is desired to process the work placed on the pallet even when the pallet is moving along an arcuate path from one straight rail to the other straight rail.

However, the moving means disclosed in JP2016-117117A elevates the short rail carrying the pallet and moves the short rail along the arcuate path. Thus, the short rail is not stable. It is very difficult to process the work on the pallet mounted on such a short rail.

The present invention aims to provide a pallet conveying apparatus and a pallet conveying method enabling a work placed on a pallet to be processed while the pallet is moving from one straight rail to the other straight rail.

According to one aspect of the present invention, a pallet conveying apparatus includes a pair of straight rails provided parallel to each other at a predetermined distance from each other in a horizontal direction, the pair of straight rails being configured such that a pallet is movably mounted thereon, a pallet linear feeding unit configured to convey the pallet mounted on the straight rails along the straight rails, a pair of curved rails provided in a curved manner to couple both end parts of the pair of straight rails, the pair of curved rails being configured such that the pallet is movably mounted thereon, and a pallet curved feeding unit configured to convey the pallet mounted on the curved rails along the curved rails.

According to other aspect of the present invention, a pallet conveying method for guiding a pallet, which is moved on either one of two straight rails parallel to each other at a predetermined distance from each other, from an end part of the one straight rail to an end part of other straight rail, includes coupling both end parts of the pair of straight rails by a pair of curved rails, and conveying the pallet, which is moved from the one straight rail to the curved rail, to the end part of the other straight rail along the curved rail.

DESCRIPTION OF EMBODIMENT

Next, an embodiment of the present invention is described on the basis of the drawings.

In the description of the configuration of a pallet conveying apparatus 10, three axes X, Y and Z orthogonal to each other are set in each figure. The X axis is an axis extending substantially in a horizontal lateral direction, the Y axis is an axis extending substantially in a horizontal front-rear direction and the Z axis is an axis extending in a vertical direction.

Figure 1:
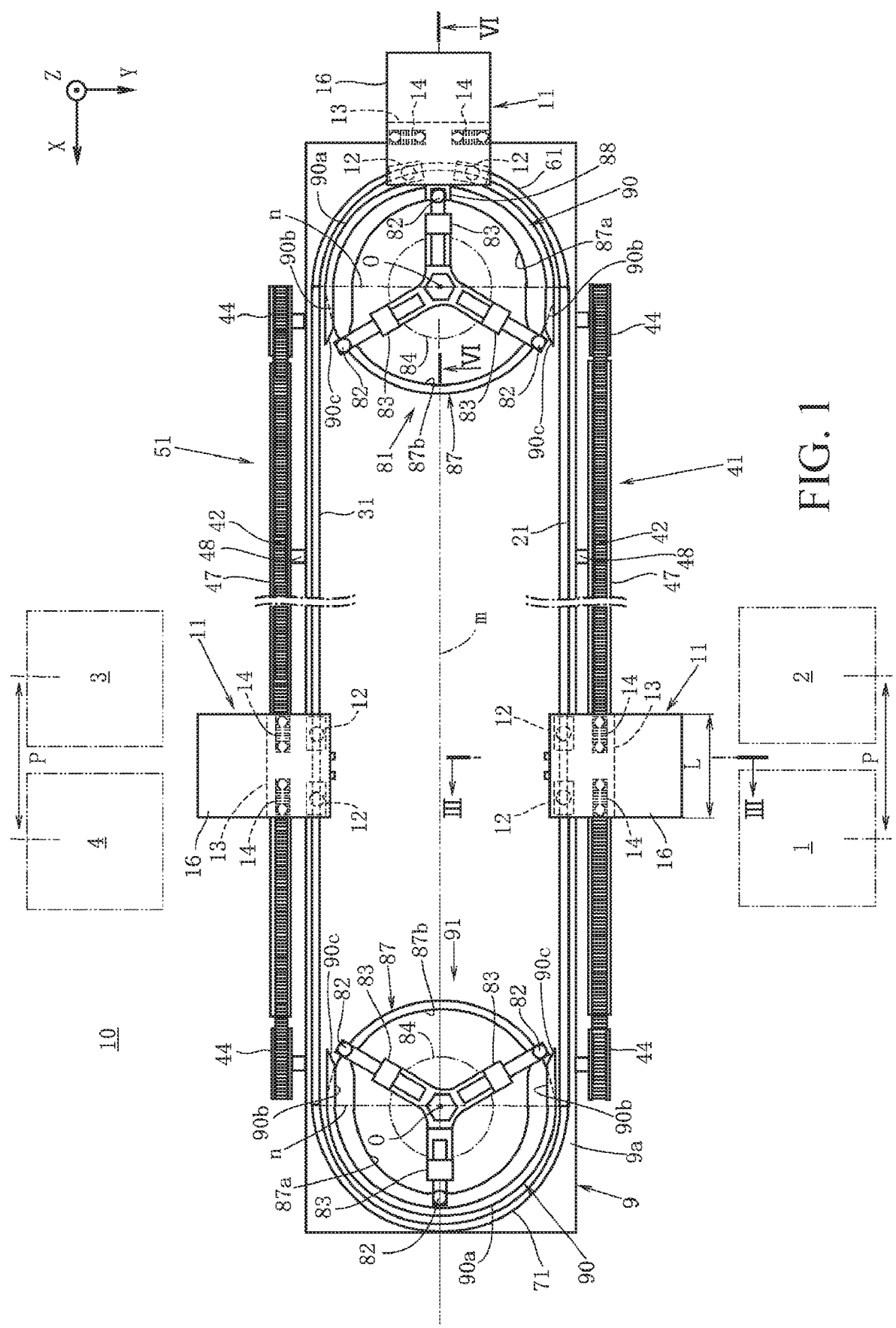
FIG. 1 is a plan view of a pallet conveying apparatus according to an embodiment of the present invention.

FIG. 1 shows the pallet conveying apparatus 10 according to the present embodiment. The pallet conveying apparatus 10 includes a pair of straight rails 21, 31 configured such that pallets 11, on which works (not shown, the same hereinafter) are placed, are movably mounted thereon. The pair of straight rails 21, 31 are provided parallel to each other at a predetermined distance from each other in a horizontal direction (Y-axis direction). Each of the pair of straight rails 21, 31 is configured such that the pallets 11 are movably mounted thereon, and is provided to extend straight in an X-axis direction on a top board 9a of a base 9.

Figure 3:
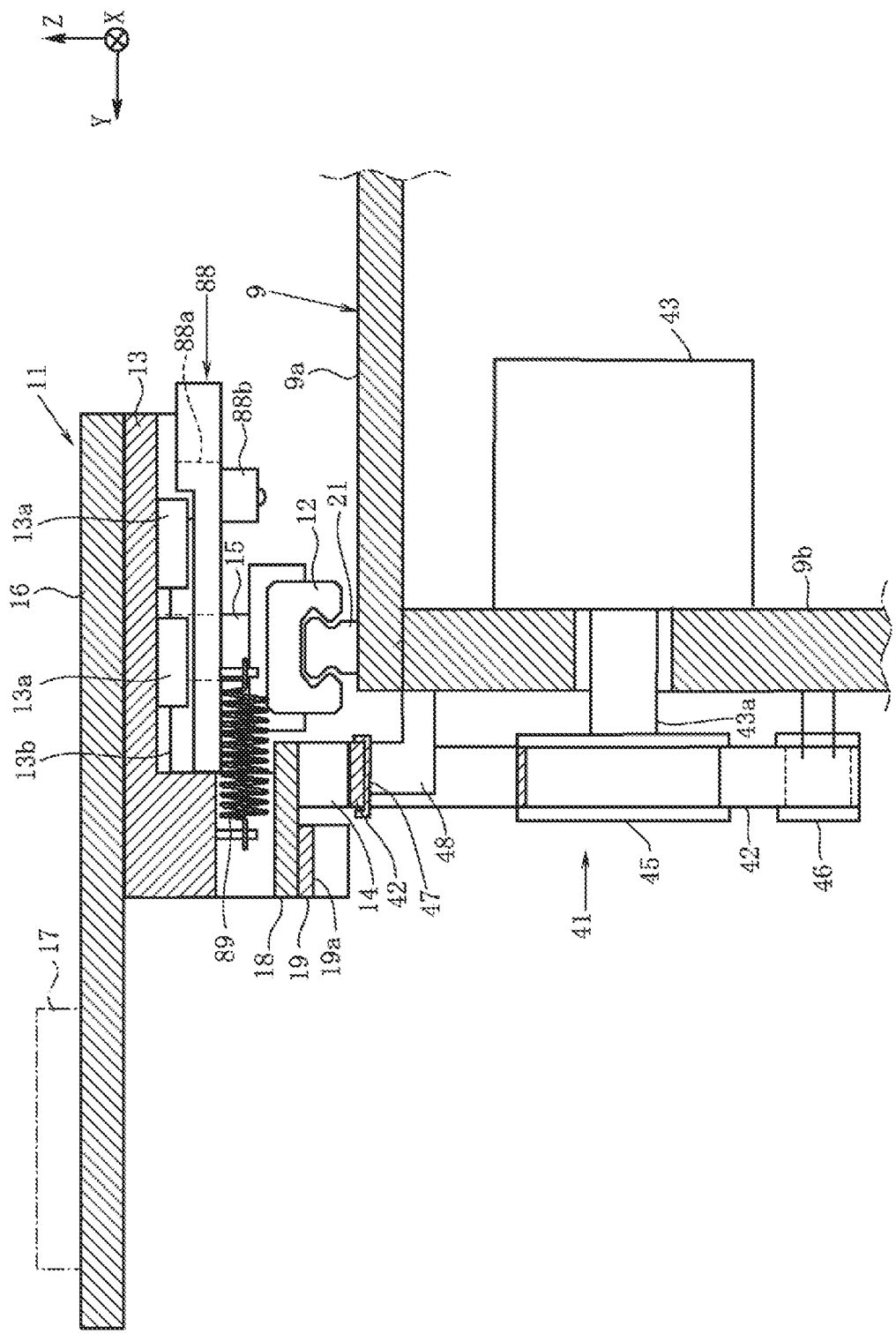
FIG. 3 is a sectional view along line III-III of FIG. 1.
Figure 4:
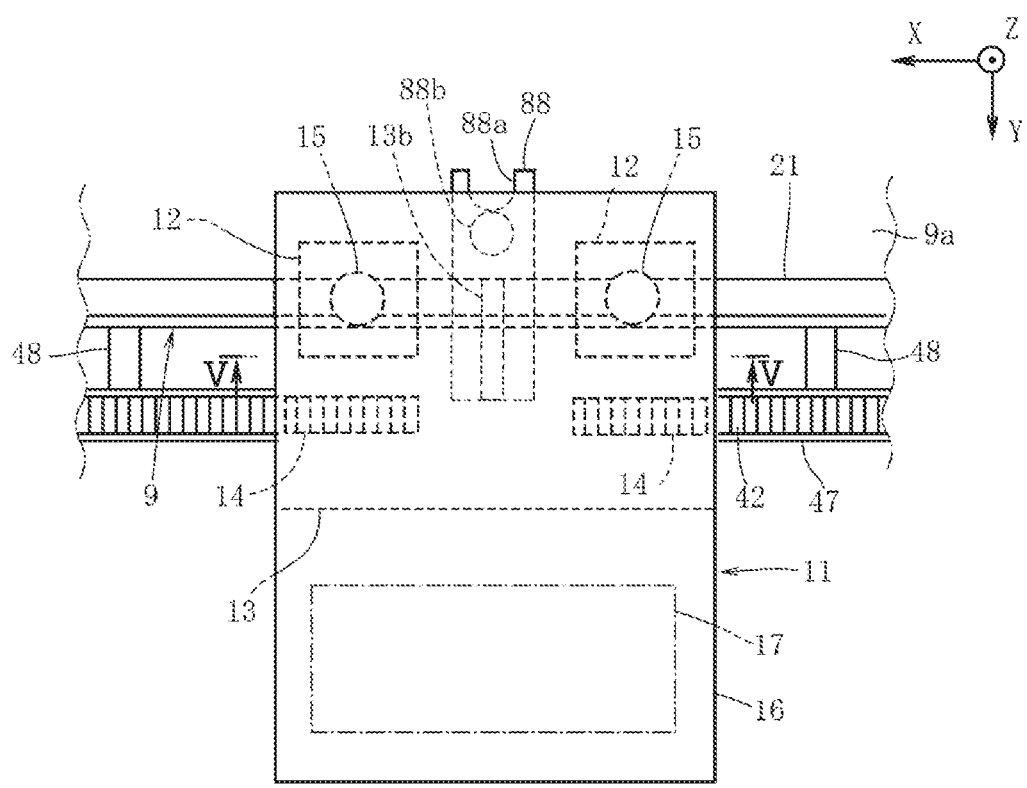
FIG. 4 is a plan view of a pallet used in the pallet conveying apparatus shown in FIG. 1 viewed in a direction IV of FIG. 2.
Figure 5:
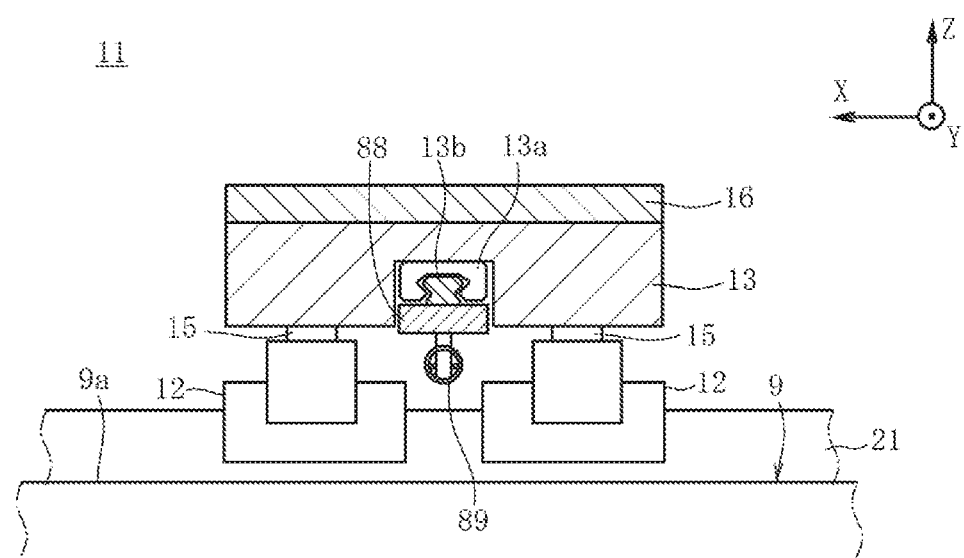
FIG. 5 is a sectional view along line V-V of FIG. 4.

The pair of straight rails 21, 31 are configured such that the pallets 11 are mounted in a horizontal state thereon As shown in detail in FIGS. 3 to 5, the pair of straight rails 21, 31 are commercially available linear motion guide rails directly fixed to the upper surface of the top board 9a of the base 9.

The pallet 11 includes linear motion blocks 12 configured to straddle over the pair of straight rails 21, 31, a pedestal 13 having the linear motion blocks 12 mounted thereon and engaging members 14 provided on the pedestal 13. The linear motion blocks 12 are configured to move on the pair of straight rails 21, 31.

The linear motion blocks 12 are sold while being paired with commercially available linear motion guide rails used as the straight rails 21, 31. In this embodiment, the pair of linear motion blocks 12, 12 are provided at a predetermined interval from each other on the pedestal 13. Further, each of the pair of linear motion blocks 12, 12 is mounted on the pedestal 13 slightly rotatably via a boss 15.

Here, the linear motion blocks 12 preferably include unillustrated roller retainers. By using the linear motion blocks 12 including the roller retainers, resistance received by the pallet 11 moving on the pair of straight rails 21, 31 can be drastically reduced while movements in width directions of the pair of straight rails 21, 31 and inclination with respect to the pair of straight rails 21, 31 are prevented.

Figure 2:
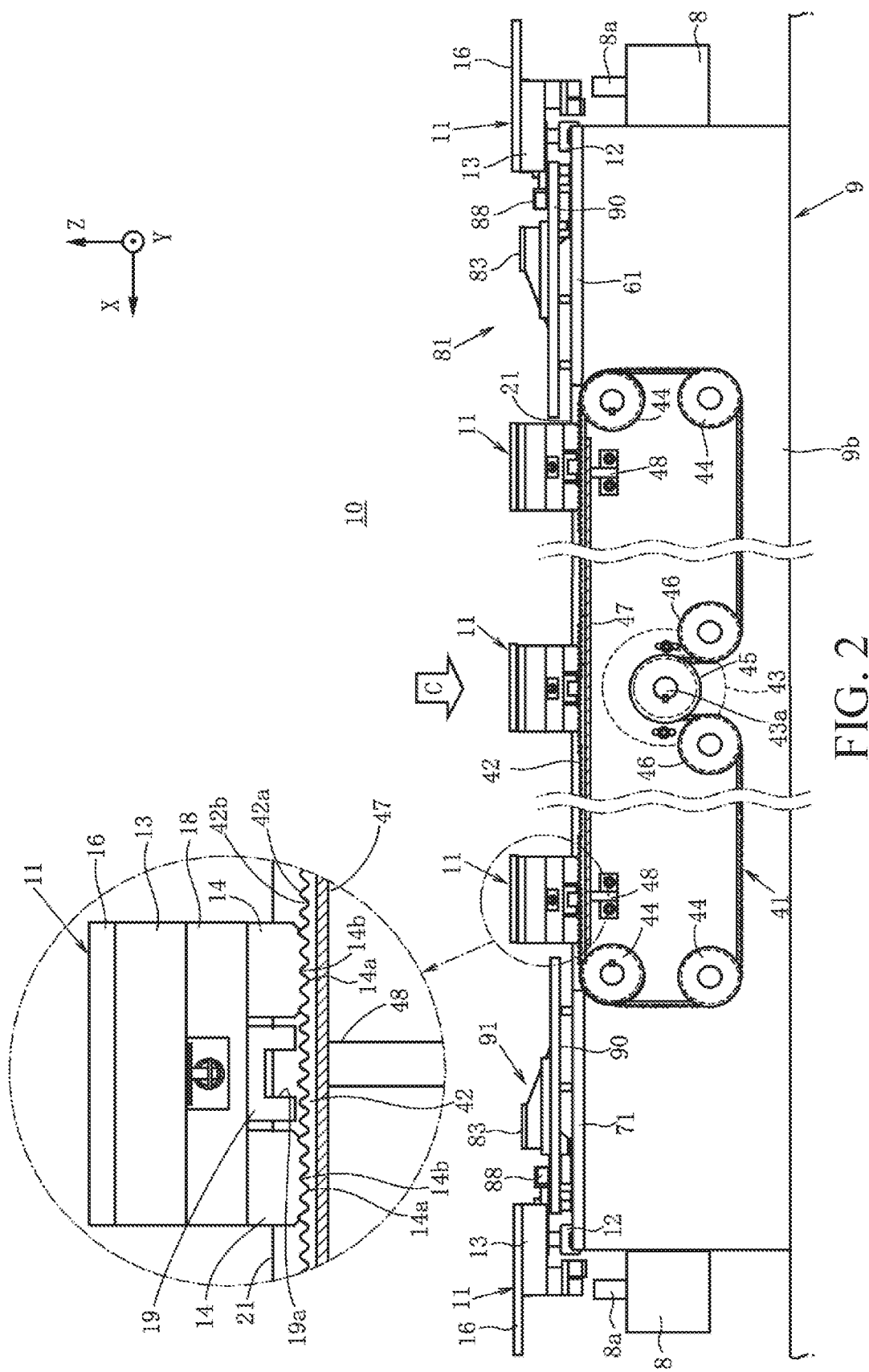
FIG. 2 is a front view of the pallet conveying apparatus shown in FIG. 1.

As shown in FIGS. 2 and 3, the linear motion blocks 12 are mounted on one lateral part of the pedestal 13 and a mounting member 18 is mounted adjacent to the linear motion blocks 12 on the other lateral part of the pedestal 13. The engaging members 14 are mounted on the mounting member 18, and a supporting member 19 is further mounted on the mounting member 18 adjacent to the engaging members 14.

As shown in FIG. 2, the supporting member 19 is formed with a recess 19a into which a projecting shaft 8a of a supporting device 8 can enter from below. The supporting devices 8 are mounted on the base 9 (only two supporting devices 8 on both sides are shown in FIG. 2). The supporting device 8 is configured to constrain a movement of the pallet 11 and enable the processing of the unillustrated work mounted on the pallet 11 by causing the projecting shaft 8a to project and inserting the projections 8a into the recess 19a of the supporting member 19.

As shown in FIG. 3, one lateral part of a mounting plate 16 is placed on the pedestal 13, and the other lateral part of the mounting plate 16 projects from the other end of the pedestal 13. A mounting tool 17 on which the work (not shown, the same hereinafter) is mounted is provided on the other lateral part of the mounting plate 16.

As just described, by movably supporting the linear motion blocks 12 fixed on the one lateral part of the pedestal 13 to straddle over the pair of straight rails 21, 31, the pallet 11 is movably mounted on the pair of straight rails 21, 31 in a horizontal state.

As shown in FIG. 1, the pedestal 13 and the mounting plate 16 in the pallet 11 are preferably formed such that lengths L thereof in the X-axis direction are equal to or shorter than an interval P between adjacent ones of machine tools 1 to 4.

In this case, if the plurality of pallets 11 are moved on the pair of straight rails 21, 31 at the predetermined interval P from each other while carrying the works, the other lateral part of each mounting plate 16 in the horizontal state projects toward the machine tools 1 to 4 and the plurality of pallets 11 face each machine tool 1 to 4. Thus, the work mounted on the lateral part of the pallet via the mounting tool 17 (see FIG. 3) can be processed by the machine tools 1 to 4.

Further, the pallet conveying apparatus 10 includes pallet linear feeding units 41, 51 that convey the pallets 11 along the pair of straight rails 21, 31.

Specifically, the pallet conveying apparatus 10 includes a first pallet linear feeding unit 41 that conveys the pallets 11 mounted on the one straight rail 21 along the one straight rail 21 and a second pallet linear feeding unit 51 that conveys the pallets 11 mounted on the other straight rail 31 along the other straight rails 31.

Since the first and second pallet linear feeding units 41, 51 have the same structure, the first pallet linear feeding unit 41 is described as a representative below.

As shown in FIGS. 1 and 2, the first pallet linear feeding unit 41 includes a circulation belt 42 provided endlessly and configured to circulate along the one straight rail 21 and a circulation mechanism 43 (FIG. 2) configured to circulate this circulation belt 42. The circulation belt 42 is configured to be engageable with the pallets 11.

As shown in FIG. 2, driven pulleys 44 are provided at each of positions corresponding to both ends of the one straight rail 21 and positions below the former positions on a side wall 9b of the base 9. The circulation belt 42 is stretched to surround these four driven pulleys 44.

The circulation belt 42 is a so-called toothed belt. As shown in an enlarged view of FIG. 2, the circulation belt 42 is such a belt that projections and recesses 42a, 42b extending in a width direction are alternately connected in a longitudinal direction. The pallet 11 is formed with projections and recesses 14a, 14b engageable with the recesses and projections 42b, 42a. The projections and recesses 14a, 14b are formed on the engaging members 14 constituting the pallet 11.

As shown in FIG. 3, the engaging members 14 are provided below the pedestal 13 similarly to the linear motion blocks 12. The driven pulleys 44 shown in FIG. 2 are mounted at the positions corresponding to the both ends of the one straight rail 21 so that the engaging members 14 overlap and engage with the circulation belt 42 when the pallet 11 is mounted on the straight rail 21.

Specifically, as shown in the enlarged view of FIG. 2, when the pallet 11 is mounted on the straight rail 21, the engaging members 14 overlap the circulation belt 42 and the projections and recesses 14a, 14b formed on the engaging members 14 are engaged with the recesses and projections 42b, 42a formed on the circulation belt 42.

Further, a servo motor 43 serving as the circulation mechanism that circulates the circulation belt 42 is provided on the side wall 9b of the base 9. A rotary shaft 43a of the servo motor 43 projects from the side wall 9b, and a drive pulley 45 is mounted on the rotary shaft 43a. The drive pulley 45 is provided on the same plane as the four driven pulleys 44 and a pair of turning pulleys 46 for turning the circulation belt 42 to stretch the circulation belt 42 on the drive pulley 45 are rotatably supported on the side wall 9b near the drive pulley 45.

When the servo motor 43 is driven in response to a command from an unillustrated controller, the rotary shaft 43a rotates together with the drive pulley 45 and the circulation belt 42 stretched on the drive pulley 45 circulates while surrounding the four driven pulleys 44.

When the pallet 11 is mounted on the straight rail 21 and the projections and recesses 14a, 14b on the pallet 11 are engaged with the recesses and projections 42b, 42a of the circulation belt 42, a movement of the pallet 11 in the X-axis direction independent of the circulation belt 42 is constrained. Thus, when the servo motor 43 is driven and the circulation belt 42 engaged with the pallet 11 is circulated, the pallet 11 moves together with the circulation belt 42. In this way, the pallet 11 is conveyed along the pair of straight rails 21, 31 along which the circulation belt 42 extends.

Here, a member denoted by 47 in FIG. 2 is a supporting member 47 for preventing the separation of the circulation belt 42 from the engaging members 14 by preventing the loosening of the circulation belt 42 between the driven pulleys 44. A member denoted by 48 is a mounting tool 48 for mounting the supporting member 47 on the side wall 9b.

As shown in FIG. 1, the pallet conveying apparatus 10 includes a pair of curved rails 61, 71 provided in a curved manner to couple both end parts of the pair of straight rails 21, 31. The pallets 11 are movably mounted on the pair of curved rails 61, 71. The pair of curved rails 61, 71 are sold together with the commercially available linear motion guide rails, which are the pair of straight rails 21, 31. Thus, each of the pair of curved rails 61, 71 has the same cross-sectional shape as the pair of straight rails 21, 31 and is directly fixed to the top board 9b of the base 9 to couple the both end parts of the pair of straight rails 21, 31.

The pair of curved rails 61, 71 have a semicircular shape and couple the end parts of the pair of straight rails 21, 31. Thus, the pair of straight rails 21, 31 and the pair of curved rails 61, 71 are arranged in the form of a track as a whole by providing the curved rails 61, 71 respectively on both sides of the pair of straight rails 21, 31.

Thus, the pallet 11 that is mounted and conveyed on either one of the straight rail 21, 31 moves onto and is mounted on the curved rail 61, 71 from the end part of the straight rail 21, 31, and is conveyed to the other straight rail 31, 21 by moving on the curved rail 61, 71. Therefore, the pallet conveying apparatus 10 can convey the pallets 11 on the track-like path.

The pallet conveying apparatus 10 is provided with pallet curved feeding units 81, 91 that convey the pallets 11 mounted on the pair of curved rails 61, 71 along the pair of curved rails 61, 71.

Specifically, the pallet conveying apparatus 10 includes a first pallet curved feeding unit 81 that conveys the pallet 11 mounted on one curved rail 61 along the one curved rail 61 and a second pallet curved feeding unit 91 that conveys the pallet 11 mounted on the other curved rail 71 along the other curved rail 71.

Since the first and second pallet curved feeding units 81, 91 have the same structure, the first pallet curved feeding unit 81 is described as a representative below.

The pallet curved feeding unit 81 includes arms 83 each having a locking member 82 provided on a tip and an actuator 84 that rotates the arms 83 about base ends of the arms 83 in a horizontal plane.

In this embodiment, as shown by dashed-dotted line in FIG. 1, the actuator 84 is arranged at an intersection of a middle line 'm' between the pair of straight rails 21, 31 provided at the predetermined distance from each other and a line 'n' that links the end surfaces of the pair of straight rails 21, 31.

Figure 6:
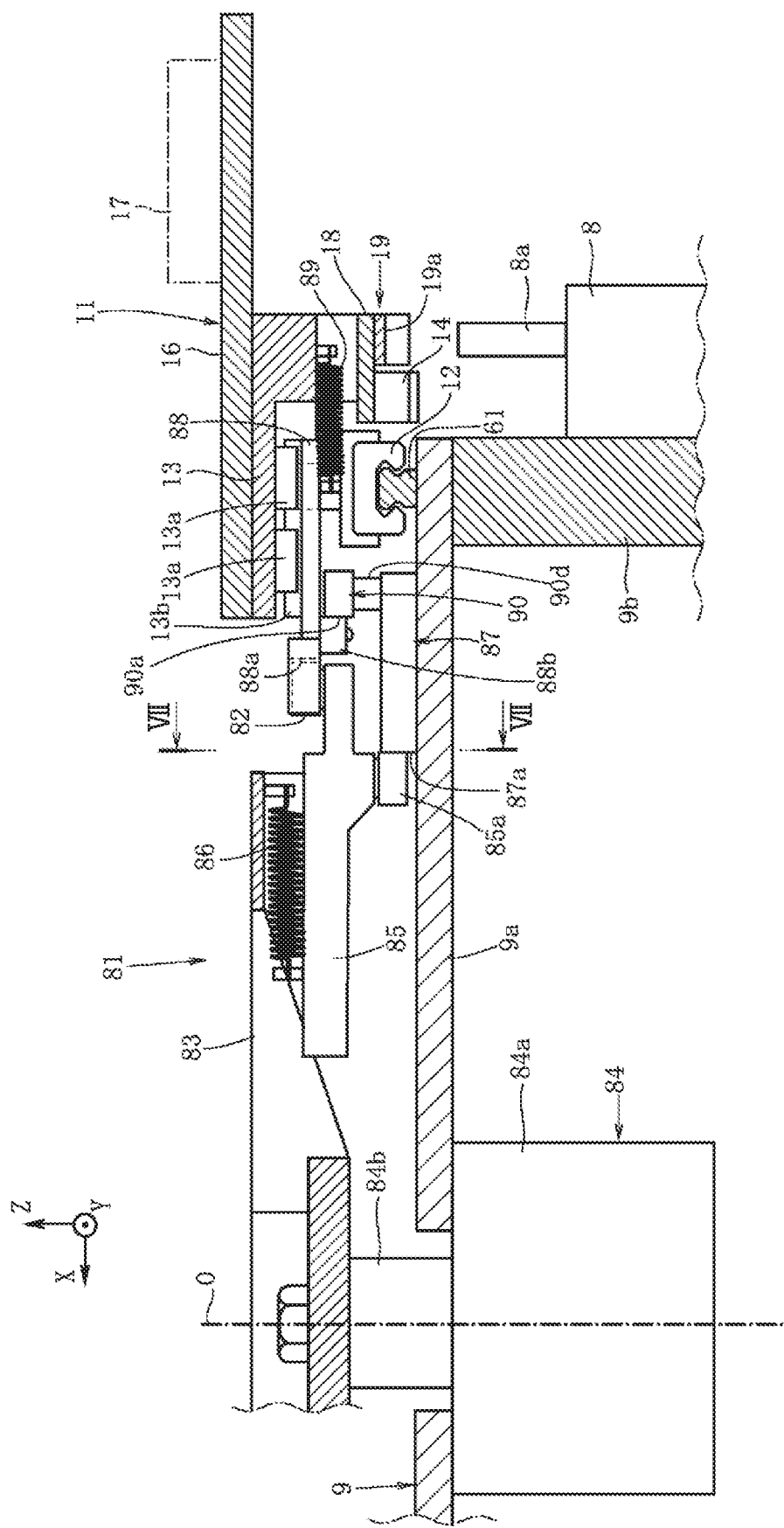
FIG. 6 is a sectional view along line VI-VI of FIG. 1 showing a pallet curved feeding unit.

As shown in FIG. 6, the actuator 84 is a servo motor including a rotating rod 84b projecting upward from a substantially central part of the upper surface of a cylindrical body portion 84a. The servo motor rotates the rotating rod 84b about an axis of rotation O along the vertical direction by electricity.

The actuator 84 is provided at the intersection of the middle line 'm' (FIG. 1) between the pair of straight rails 21, 31 and the line 'n' (FIG. 1) that links the end surfaces of the pair of straight rails 21, 31, with the rotating rod 84b facing upward. The base ends of the arms 83 are mounted on the rotating rod 84b of the actuator 84.

As shown in FIG. 1, in the present embodiment, three arms 83 are radially arranged every 120° in the horizontal plane. The actuator 84 can rotate the rotating rod 84b and change a rotation speed of the rotating rod 84b. By the rotation of the rotating rod 84b, the three arms 83 rotate about the axis of rotation O along the vertical direction on the base ends thereof in the horizontal plane. Thus, the tips of the arms 83 move along the one curved rail 61.

The locking member 82 is provided on the tip of each arm 83. The locking member 82 is a cam follower provided on the tip of the arm 83. The locking member 82 is provided on the tip of the arm 83 movably in a longitudinal direction of the arm 83 via a rod 85 (FIG. 6).

Figure 7:
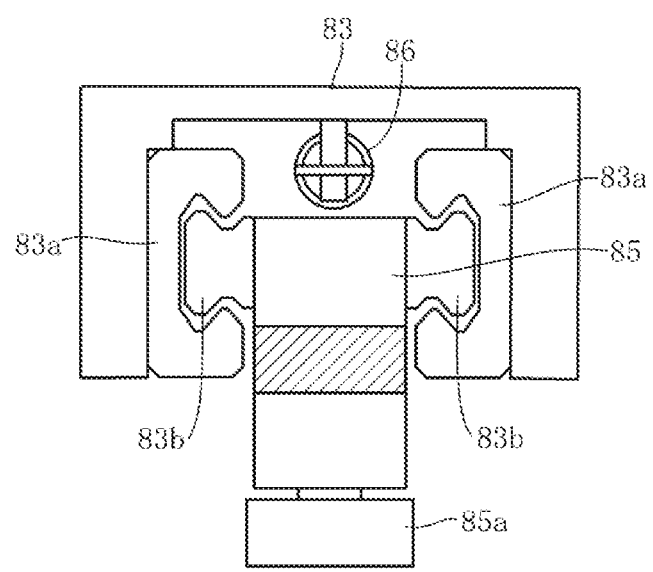
FIG. 7 is a sectional view along line VII-VII of FIG. 6.

Specifically, as shown in FIG. 7, a pair of linear motion blocks 83a are provided to sandwich the rod 85 on the tip of the arm 83, and rails 83b movable with respect to the linear motion blocks 83a are provided on both sides of the rod 85. In this way, the rod 85 is provided movably in the longitudinal direction of the arm 83 on the tip of the arm 83.

As shown in FIG. 6, the cam follower, which is the locking member 82, is provided on the tip of the rod 85. The arm 83 is provided with a coil spring 86 that biases the rod 85 in a direction to retract the rod 85 toward a base end side from the tip of the arm 83. An annular plate cam 87 that causes the rod 85 to project from the tip of the arm 83 against a biasing force of this coil spring 86 is provided on the top board 9a of the base 9.

As shown in FIG. 1, the annular plate cam 87 is formed into a doughnut shape and mounted on the top board 9a to surround the actuator 84. As shown in FIG. 6, the rod 85 is provided with a cam follower 85a in contact with the inner periphery of the annular plate cam 87.

As shown in FIGS. 8 to 14, the annular plate cam 87 is formed with a small-diameter portion 87a and a large-diameter portion 87b. The cam follower 85a is in contact with the inner peripheries of the small-diameter portion 87a and the large-diameter portion 87b. The small-diameter portion 87a causes the rod 85 to retract into the tip of the arm 83 against the biasing force of the coil spring 86 (FIG. 6) when the tip of the arm 83 is facing the curved rail 61, 71. The large-diameter portion 87b causes the rod 85 to project from the tip of the arm 83 when the tip of the arm 83 is not facing the curved rail 61, 71.

This annular plate cam 87 is formed with diameter changing portions 87c connecting the large-diameter portion 87b and the small-diameter portion 87a at positions corresponding to the end parts of the straight rails 21, 31.

Figure 8:
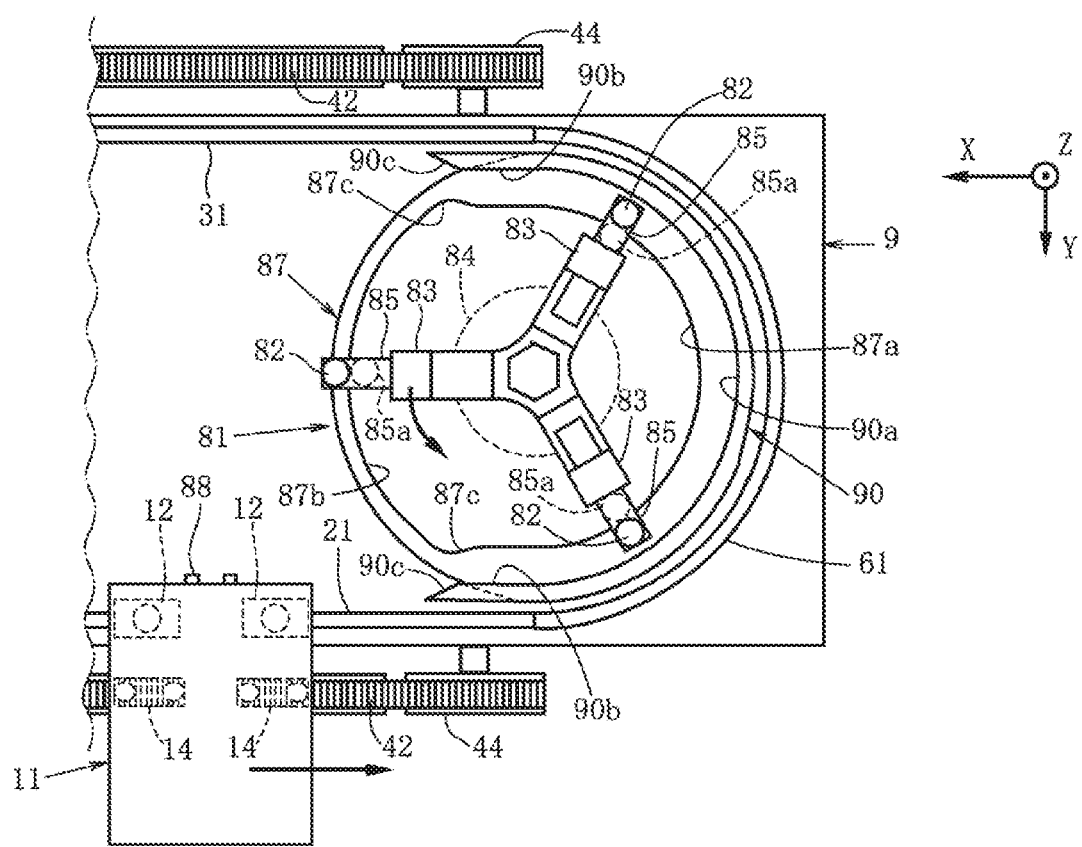
FIG. 8 is a top view showing a state where the conveyed pallet is approaching an end part of one straight rail.
Figure 9:
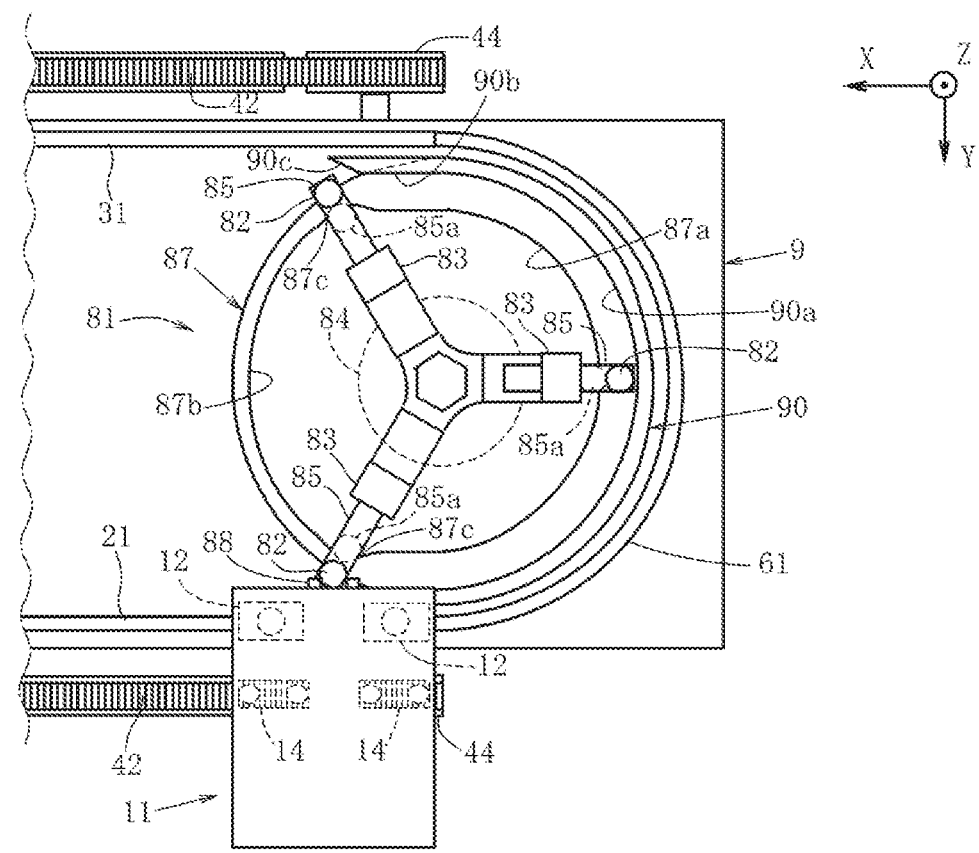
FIG. 9 is a top view showing a state where a locking member is facing a receiving member of the pallet.
Figure 10:
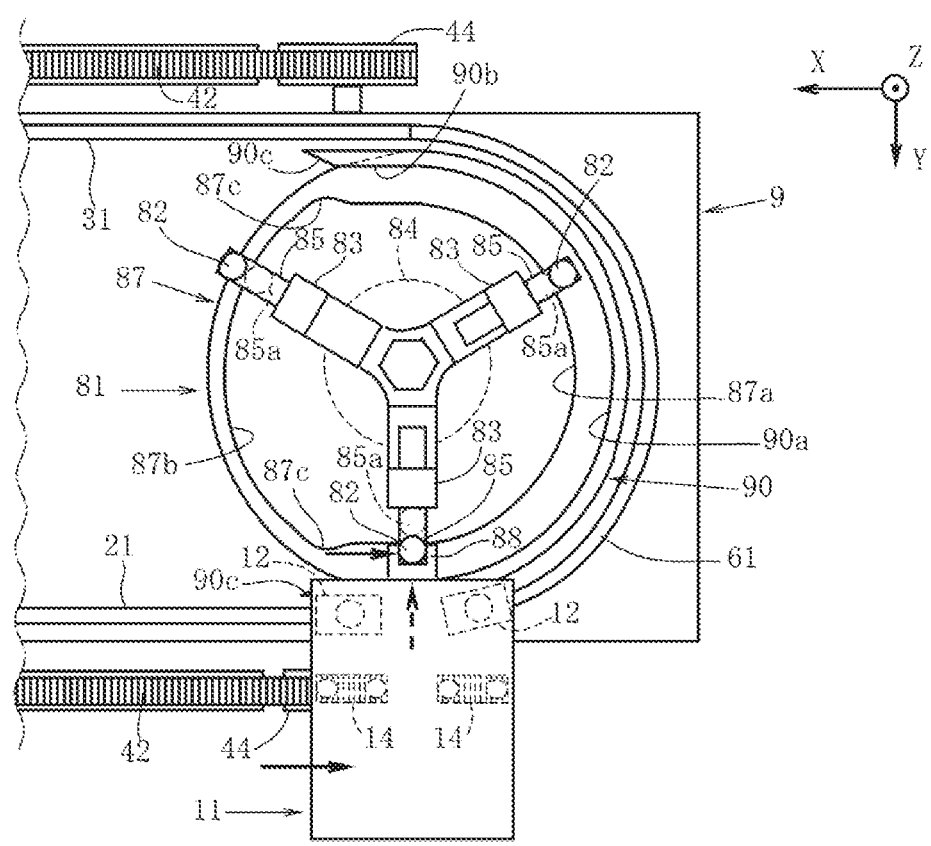
FIG. 10 is a top view showing a state where the pallet has reached the end part of the one straight rail and the locking member is locked to the receiving member.

If the tip of the arm 83 not facing the curved rail 61 (see FIG. 8) approaches the end part of the straight rail 21 according to the rotation of the arm 83, the cam follower 85a held in contact with the large-diameter portion 87b contacts the diameter changing portion 87c as shown in FIG. 9. The projecting rod 85 is caused to gradually retract into the tip of the arm 83 by the diameter changing portion 87c and, as shown in FIG. 10, the locking member 82 that is provided on the rod 85 moves parallel to the end part of the straight rail 21. When the tip of the arm 83 comes to face the curved rail 61, the cam follower 85a is transferred from the diameter changing portion 87c to the small-diameter portion 87a to contact the small-diameter portion 87a, whereby the retraction of the rod 85 is completed.

Figure 11:
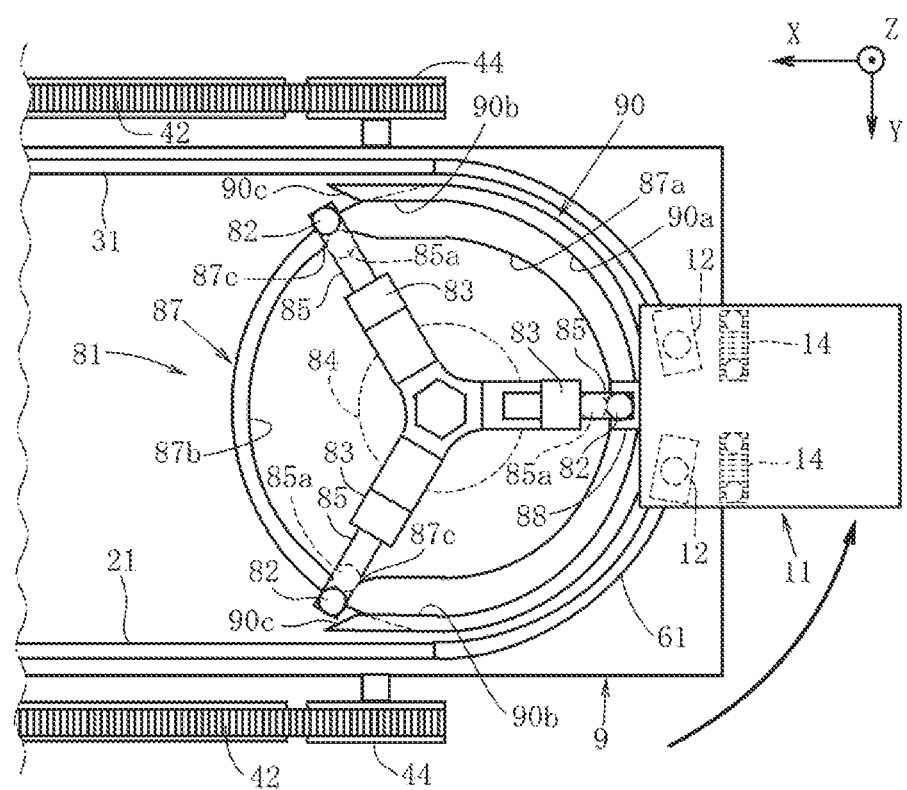
FIG. 11 is a top view showing a state where the pallet is moving on a curved rail.
Figure 12:
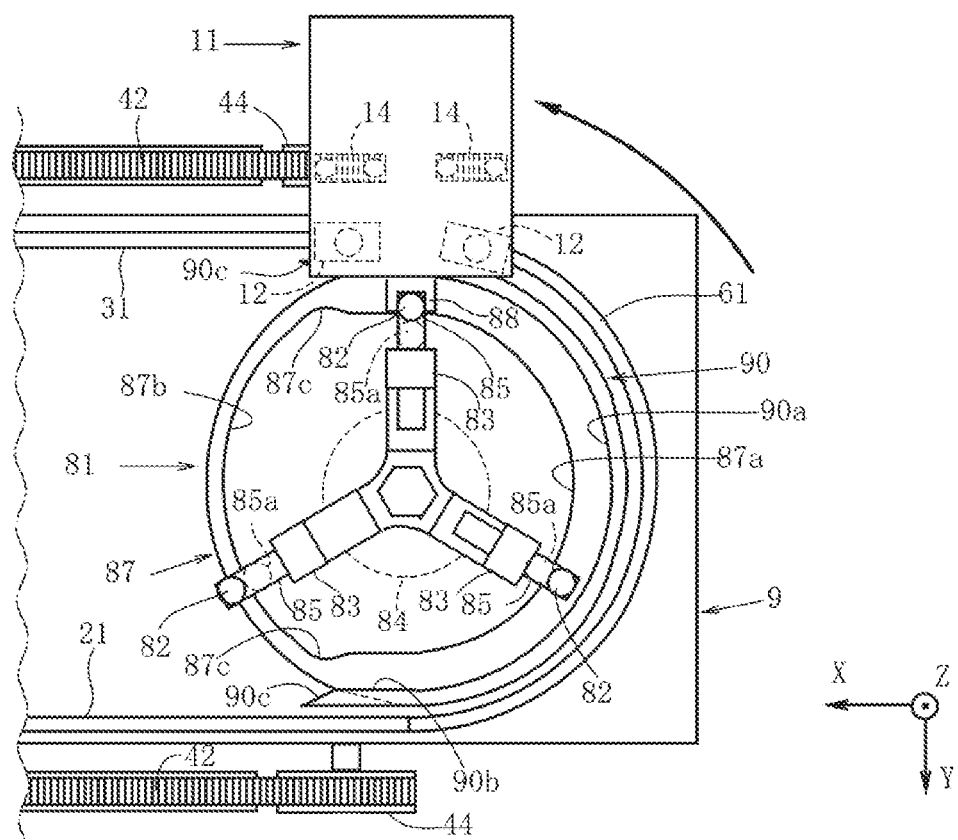
FIG. 12 is a top view showing a state where the pallet has reached an end part of the other straight rail.
Figure 13:
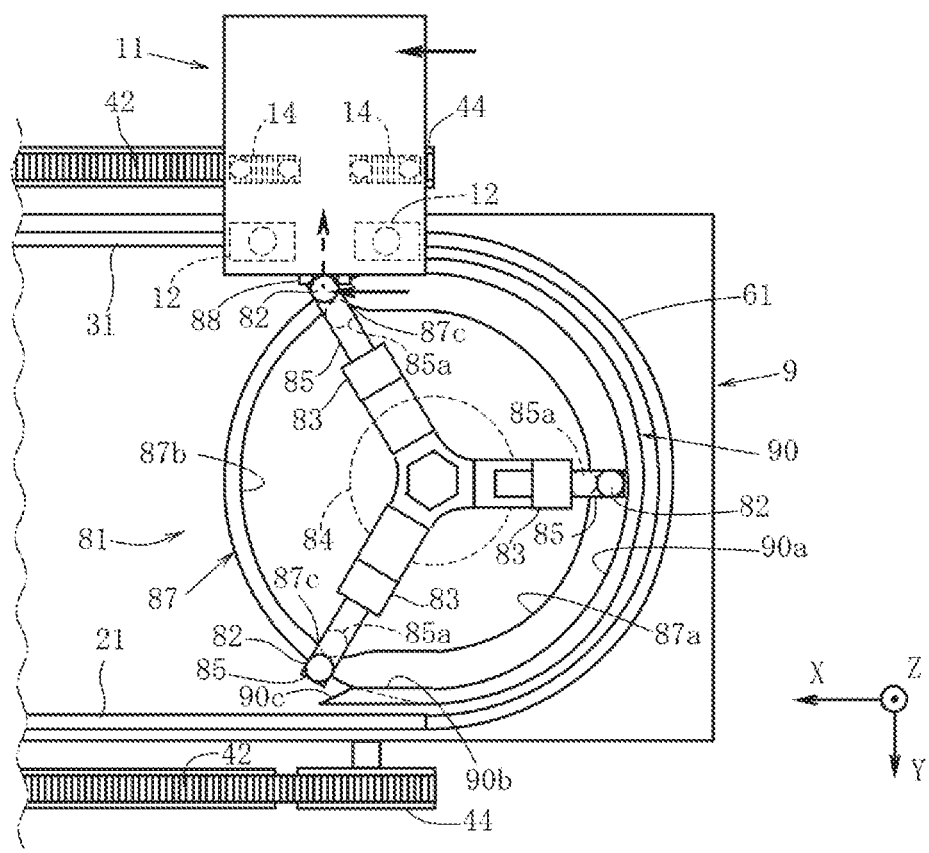
FIG. 13 is a top view showing a state where the pallet is moving on the other straight rail and the locking member is separated from the receiving member.

When the arm 83 further rotates, the cam follower 85a contacts the small-diameter portion 87a and the tip of the arm 83 having the rod 85 retracted thereinto (see FIG. 11) reaches the end part of the straight rail 21 from the curved rail 61 as shown in FIG. 12, the cam follower 85a held in contact with the small-diameter portion 87a contacts the diameter changing portion 87c. As shown in FIG. 13, the rod 85 that is retracted into the arm 83 gradually projects and the locking member 82 that is provided on the rod 85 moves parallel to the end part of the straight rail 21. When the locking member 82 reaches the large-diameter portion 87b, the projection of the rod 85 is completed and the locking member 82 is separated from the straight rail 21.

As shown in FIG. 6, the pallet 11 is provided with a receiving member 88 lockable to the locking member 82. As shown in FIG. 4, the receiving member 88 in the present embodiment is a bar-like object having a cutout 88a formed in a tip. The locking member 82 can enter the cutout 88a. The receiving member 88 is projectably and retractably provided on the pallet 11.

Specifically, as shown in FIGS. 3 and 6, another linear motion block 13a perpendicular to the rail having the linear motion blocks 12, 12 mounted thereon and horizontal is provided between the pair of linear motion blocks 12, 12 on the pallet 11. The receiving member 88 is provided with a rail 13b movable with respect to the linear motion block 13a.

In this way, the pallet 11 is provided with the receiving member 88 movable horizontally in a direction perpendicular to the rail having the pallet 11 mounted thereon. As shown in FIG. 4, a part of the receiving member 88 projects from a side surface of the pedestal 13 on the side where the motion blocks 12, 12 are provided, and the cutout 88a into which the locking member 82 (FIG. 6) can enter is formed in this projecting part.

As shown in FIG. 3, a coil spring 89 is provided over the receiving member 88 and the pedestal 13. The coil spring 89 biases the receiving member 88 in a direction to retract the cutout 88a in the receiving member 88 from the side surface of the pedestal 13 into a space below the pedestal 13. As shown in FIG. 6, the top board 9a of the base 9 is provided with a U-shaped plate cam 90 that causes the cutout 88a to project from the side surface of the pedestal 13 against a biasing force of the coil spring 89.

The U-shaped plate cam 90 is provided to overlap the annular plate cam 87 provided on the top board 9a of the base 9 via a boss 90d. The receiving member 88 having a bar-like shape is provided with a cam follower 88b in contact with the inner periphery of the U-shaped plate cam 90.

As shown in FIG. 1, the U-shaped plate cam 90 is provided with a semicircular portion 90a extending along the curved rail 61, 71 and straight portions 90b extending from both ends of the semicircular portion 90a in parallel to the straight rails 21, 31, and formed into a U shape by those portions.

As shown in FIG. 6, the U-shaped plate cam 90 is so provided that the cam follower 88b comes into contact with the inner side of the semicircular portion 90a in the U-shaped plate cam 90 when the pallet 11 is mounted on the curved rail 61. The U-shaped plate cam 90 causes the cutout 88a to project from the side surface of the pedestal 13 against the biasing force of the coil spring 89 by the contact of the semicircular portion 90a and the cam follower 88b.

On the other hand, when the pallet 11 is mounted on an intermediate part of the straight rail 21 as shown in FIG. 3, the U-shaped plate cam 90 is not in contact with the cam follower 88b. Thus, the receiving member 88 is moved by the biasing force of the coil spring 89 and the cutout 88a in the tip of the receiving member 88 retracts into the space below the pedestal 13 from the side surface of the pedestal 13. It should be noted that the intermediate part of the straight rail 21 is any part of the straight rail 21 except the both end parts along which the straight portions 90b extend.

As shown in FIG. 1, leading end edges 90c of the straight portions 90b projecting from the both sides of the semicircular portion 90a are obliquely formed. When the pallet 11 moving on the straight rail 21 reaches the end part of the straight rail 21 as shown in FIG. 9, the cam follower 88b on the receiving member 88 that is provided on the pallet 11 contacts the inclined leading end edge 90c of the straight portion 90b. When the pallet 11 further moves, the cutout 88a projects from the side surface of the pedestal 13 along the inclination and the locking member 82 moving parallel to the end part of the straight rail 21 enters this cutout 88a as shown in FIGS. 6 and 10.

When the locking member 82 that is provided on the tip of the arm 83 enters the cutout 88a as shown in FIG. 10, a movement of the pallet 11 separate from and independent of the rotation of the arm 83 is disabled. Thus, when the arm 83 rotates, the pallet 11 moves from the straight rail 21 to the curved rail 61, is mounted on the curved rail 61 and moves along a semicircular path along the curved rail 61.

When the pallet 11 that moved along the semicircular path reaches the straight rail 31 as shown in FIG. 12, the cam follower 88b on the receiving member 88 that is provided on the pallet 11 moves from the semicircular portion 90a to the straight portion 90b of the U-shaped plate cam 90. Since the locking member 82 moves parallel to the straight rail 31, the pallet 11 advances with the locking member 82 located in the cutout 88a. After the locking member 82 reaches the leading end edge 90c of the straight portion 90b, the cutout 88a retracts into the space below the pedestal 13 and the locking member 82 is separated from the cutout 88a.

Next, a pallet conveying method using the pallet conveying apparatus 10 is described.

The method for conveying the pallet 11 using the pallet conveying apparatus 10 includes a first pallet conveying step of conveying the pallet 11 along one straight rail 21, a first pallet moving step of moving the pallet 11 having reached the end part of the one straight rail 21 to the other straight rail 31, a second pallet conveying step of conveying the pallet 11 along the other straight rail 31 and a second pallet moving step of moving the pallet 11 having reached the end part of the other straight rail 31 to the one straight rail 21.

In the present embodiment, each step is described below, assuming that the pallet 11 is circulated on a counterclockwise path in a top view of FIG. 1.

<First Pallet Conveying Step>

In this step, the pallet 11 that is mounted on the one straight rail 21 is conveyed.

A work to which predetermined processings are to be applied is mounted on the pallet 11 in the present embodiment. The work is mounted on the pallet 11 mounted on the one straight rail 21. The pallet 11 in the present embodiment includes the mounting tool 17 (FIG. 3) that mounts the work, and the work is mounted on the pallet 11 via the mounting tool 17.

When the pallets 11 are mounted on the one straight rail 21 as shown in FIG. 2, the projections and recesses 14a, 14b provided on the pallets 11 are engaged with the recesses and projections 42b, 42a of the circulation belt 42 provided along the one straight rail 21. Thus, by driving the servo motor 43 serving as a drive mechanism to circulate the circulation belt 42, those pallets 11 can be conveyed along the one straight rail 21.

The pallet 11 is conveyed until facing each machine tool 1, 2 (FIG. 1) provided along the one straight rail 21. When the pallet 11 faces each machine tool 1, 2, the servo motor 43 is stopped. In this state, the processing is applied to the work mounted on the pallet 11 in each of those machine tools 1, 2. At this time, by conveying a plurality of pallets 11 at an interval equal to the interval P between the machine tools 1, 2, the processings by the plurality of machine tools 1, 2 can be simultaneously performed.

<First Pallet Moving Step>

In this step, the pallet 11 having reached the end part of the one straight rail 21 is moved to the other straight rail 31. This movement is made by the first pallet curved feeding unit 81 provided on one end parts of the pair of straight rails 21, 31.

In the present embodiment, the first pallet linear feeding unit 41 includes the circulation belt 42. Thus, when the pallet 11 moving along the one straight rail 21 reaches the end part of the one straight rail 21 in the aforementioned first pallet conveying step, the engaging members 14 on the pallet 11 are separated from the circulation belt 42. Thus, when the pallet 11 reaches the end part of the one straight rail 21, the circulation belt 42 and the pallet 11 are disengaged.

When the pallet 11 moves on the one straight rail 21 as shown in FIG. 8, the cam follower 88b (see FIG. 6) on the receiving member 88 that is provided on the pallet 11 contacts the inclined leading end edge 90c of the straight portion 90b of the U-shaped cam plate 90 as shown in FIG. 9. When the pallet 11 reaches the end part of the straight rail 21, the cutout 88a in the receiving member 88 projects from the side surface of the pedestal 13 along the inclination of the leading end edge 90c as indicated by a broken-like arrow of FIG. 10.

Further, the actuator 84 rotates the arms 83 in synchronization with the circulation of the circulation belt 42. When the pallet 11 reaches the end part of the straight rail 21, the locking member 82 that is provided on the tip of the arm 83 enters the cutout 88a of the receiving member 88 on the pallet projecting from the side surface of the pedestal 13. In this way, a movement of the pallet 11 separate from and independent of the rotation of the arm 83 is disabled.

The annular plate cam 87 is so formed as to move the locking member 82 provided on the tip of the arm 83 in parallel to the end part of the straight rail 21. Thus, the locking member 82 can be engaged with the receiving member 88 on the pallet 11 before the circulation belt 42 and the pallet 11 are disengaged. Therefore, it is possible to prevent a situation where the pallet 11 is neither engaged with the circulation belt 42 nor locked to the arm 83.

In the first pallet moving step, the arm 83 is rotated, the locking member 82 on the tip of the arm 83 is caused to enter the cutout 88a for locking and the pallet 11 is moved from the straight rail 21 to the curved rail 61 and mounted on the curved rail 61. The pallet 11 is provided with the pair of linear motion blocks 12, 12 at a predetermined distance from each other. Thus, when the pallet 11 moves on the curved rail 61, the pair of linear motion blocks 12, 12 have to be along the curved rail 61.

In the present embodiment, each of the pair of linear motion blocks 12, 12 is mounted slightly rotatably on the pedestal 13 via the boss 15. Thus, when the pallet 11 moves onto the curved rail 61, the pair of linear motion blocks 12, 12 slightly rotate and extend along the curved rail 61 and do not become an obstruction when the pallet 11 moves onto the curved rail 61.

By further rotating the arm 83 after the pallet 11 moves onto the curved rail 61, the pallet 11 that is locked to the tip of the arm 83 moves along a semicircular path along the curved rail 61.

The curved rail 61 is directly fixed to the top board 9a of the base 9 to couple the both end parts of the pair of straight rails 21, 31 and is not structured to move while carrying the pallet 11 as before. Thus, the pallet 11 that is mounted and moves on this curved rail 61 is stable. By stopping a movement of the pallet 11 mounted on the curved rail 61, the work on the pallet 11 can be processed.

Since the supporting member 19 is mounted adjacent to the engaging members 14 on the pallet 11 in the present embodiment as shown in FIG. 6, the projecting shaft 8a of the supporting device 8 is preferably caused to project and enter the recess 19a of the supporting member 19 in processing the work in a state shown in FIG. 11. In this way, the unillustrated work mounted on the pallet 11 can be processed with a movement of the pallet 11 constrained.

When the pallet 11 is moved to the other straight rail 31 after or without processing the work as shown in FIG. 12, the pallet 11 is subsequently moved from the curved rail 61 to the other straight rail 31. At that time, the pallet 11 is moved by controlling a circulation speed of the circulation belt 42 by the servo motor 43 and an angle of rotation of the arm 83 by the actuator 84 in accordance with a program set in advance so that the projections and recesses 14a, 14b of the engaging members 14 of the pallet 11 and the recesses and projections 42b, 42a of the circulation belt 42 extending along the other straight rail 31 are reliably engaged.

When the pallet 11 moves along the semicircular path along the curved rail 61 and reaches the other straight rail 31, the cam follower 88b on the receiving member 88 that is provided on the pallet 11 moves from the semicircular portion 90a to the straight portion 90b of the U-shaped plate cam 90. As shown in FIG. 13, the pallet 11 advances on the end part of the other straight rail 31 with the locking member 82 moving parallel to the straight rail 31 located in the cutout 88a. When the locking member 82 reaches the leading end edge 90c of the straight portion 90b, the cutout 88a retracts into the space below the pedestal 13 as indicated by a broken-line arrow and the locking member 82 is separated from the cutout 88a. In this way, a locked state of the arm 83 and the pallet 11 is released.

Figure 14:
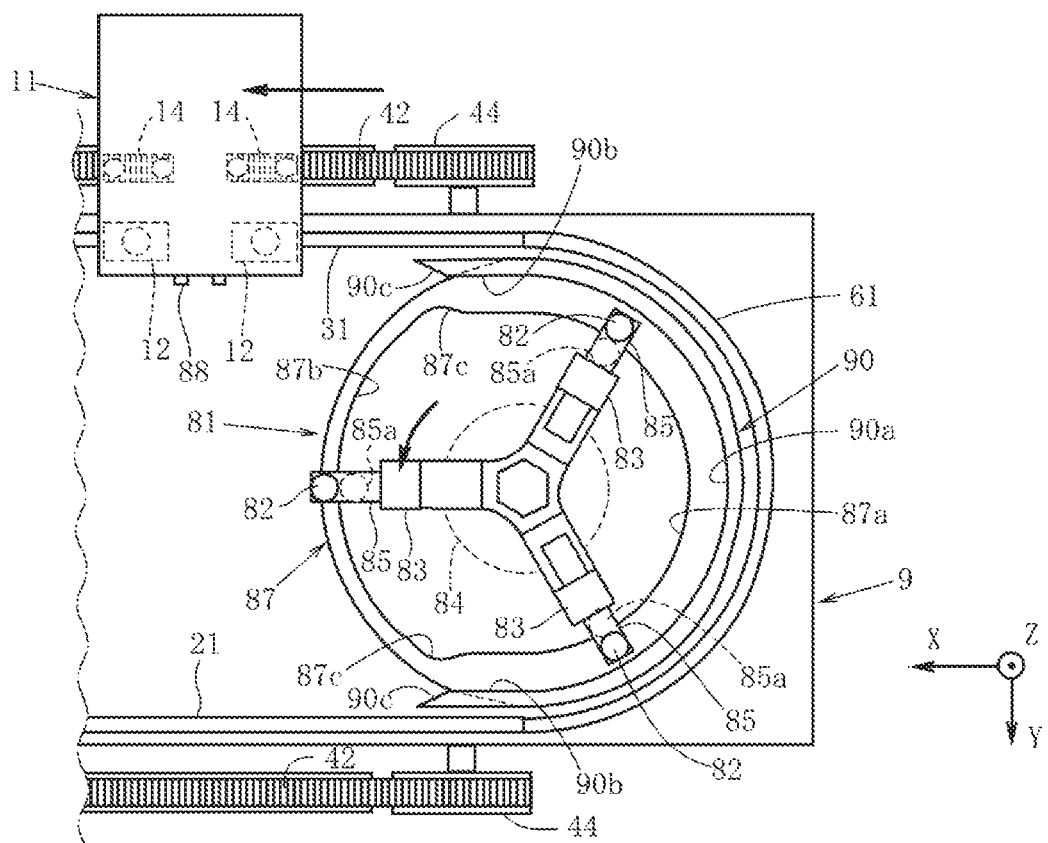
FIG. 14 is a top view showing a state where the pallet is moving on the other straight rail.

When the pallet 11 moves from the curved rail 61 to the other straight rail 31 as shown in FIG. 14, the projections and recesses 14a, 14b of the engaging members 14 of the pallet 11 and the recesses and projections 42b, 42a of the circulation belt 42 extending along the other straight rail 31 are engaged. Thus, when the locked state of the arm 83 and the pallet 11 is released, a movement of the pallet 11 separate from and independent of the circulation belt 42 is disabled.

In this way, the pallet 11 is moved from the end part of the one straight rail 21 to the other straight rail 31.

<Second Pallet Conveying Step>

In this step, the pallet 11 that is mounted on the other straight rail 31 is conveyed. When the pallet 11 is mounted on the other straight rail 31, the engaging members 14 on the pallet 11 are engaged with the circulation belt 42 extending along the other straight rail 31. By circulating the circulation belt 42, the pallet 11 can be conveyed along the other straight rail 31.

The pallet 11 is conveyed along the other straight rail until facing each machine tool 3, 4 provided along the other straight rail 31. When the pallet 11 faces each machine tool 3, 4, the servo motor 43 is stopped. In this state, the processing is applied to the work mounted on the pallet 11 in each of those machine tools 3, 4.

When the pallet 11 is mounted on the curved rail 61, the pallet 11 is not engaged with the circulation belt 42. Thus, when the circulation belt 42 is circulated separately from the rotation of the arm 83, the pallet 11 that is engaged with the circulation belt 42 is conveyed on the other straight rail 31. Therefore, the pallet 11 that is mounted on the other straight rail 31 can be moved while being engaged with the circulation belt 42 without moving the pallet 11 mounted on the curved rail 61.

Further, when an interval between the pallet 11 that is engaged with the circulation belt 42 and the pallet 11 that is mounted on the curved rail 61 becomes a predetermined interval, the arm 83 is rotated to move the pallet 11 from the curved rail 61 to the straight rail 31 and engage the pallet 11 with the circulation belt 42. In this way, the plurality of pallets 11 can be conveyed at the predetermined interval on the other straight rail 31.

If the plurality of pallets 11 are conveyed at the interval equal to the interval P between the machine tools 3 and 4 (FIG. 1) in this way, processings by the plurality of machine tools 3, 4 can be simultaneously performed.

<Second Pallet Moving Step>

In this step, the pallet 11 having reached the end part of the other straight rail 31 is moved to the one straight rail 21. This movement is made by the second pallet curved feeding unit 91 provided on the other end parts of the pair of straight rails 21, 31. Since a specific moving procedure thereof is the same as in the previous first pallet moving step, repeated description is omitted.

As just described, by performing each step described above once, each pallet 11 can be conveyed one by one in the counterclockwise direction on the track-shaped path.

Every time each of such steps is performed once, each machine tool 1 to 4 is operated to process each work mounted on each pallet in parallel, with the operation of the pallet conveying apparatus 10 stopped. During the operation of each machine tool 1 to 4, works are loaded onto and unloaded from any one of the pallets 11.

As just described, in the pallet conveying apparatus 10 and the pallet conveying method according to the present embodiment, the both end parts of the pair of straight rails 21, 31 are coupled by the pair of curved rails 61, 71 and the pallet 11 moved from the one straight rail 21, 31 to the curved rail 61, 71 is conveyed to the end part of the other straight rail 31, 21 along the curved rail 61, 71 by the pallet curved feeding unit 81, 91. The curved rails 61, 71 are provided to couple the both end parts of the pair of straight rails 21, 31 and are not structured to move while carrying the pallets 11 as before.

Thus, the pallet 11 that is mounted on the curved rail 61, 71 is stable. By stopping a movement of the pallet 11 mounted on the curved rail 61, 71, the work on the pallet 11 can be processed. Therefore, in the present embodiment, even the work that is mounted on the pallet 11 moving from the one straight rail 21, 31 to the other straight rail 31, 21 can be processed.

Further, in the pallet conveying apparatus 10 according to the present embodiment, the locking member 82 to be locked to the pallet 11 is provided to be projectable from and retractable into the tip of the arm 83. The locking member 82 is locked to the pallet 11 on the end part of the straight rail 21, 31 and, thereafter, the locking member 82 is moved parallel to the straight rail 21, 31. Thus, it is possible to prevent a situation where the pallet 11 is locked to neither the pallet linear feeding unit 41, 51 nor the pallet curved feeding unit 81, 91 on the end part of the straight rail 21, 31.

Thus, by rotating the arm 83 after the pallet 11 having moved on the straight rail 21, 31 is locked to the locking member 82 on the end part of the straight rail 21, 31, the pallet 11 can be reliably moved onto the curved rail 61, 71. Further, the pallet 11 having moved on the curved rail 61, 71 can be reliably moved to the straight rail 31, 21.

Since the pallet 11 is mounted and moved on the curved rail 61, 71, the pallet 11 can be reliably moved along the semicircular path from the end part of the one straight rail 21 to the end part of the other straight rail 31. In this way, the pallet 11 can be reliably circulated on the track-shaped path. Therefore, the side of the pallet 11 where the work is mounted can be constantly caused to face outward and a degree of freedom in arranging the machine tools 1 to 4 for processing the works can be improved.

Further, in the pallet conveying apparatus 10 according to the present embodiment, the receiving member 88 to be locked to the locking member 82 is projectably and retractably provided on the pallet 11. Thus, the receiving member 88 can be retracted into the pallet 11 mounted on the straight rail 21, 31 and troubles caused by the receiving member 88 projecting from the pallet 11 mounted and moving on the straight rail 21, 31 can be eliminated.

It should be noted that although the pallet linear feeding unit 41, 51 includes the circulation belt 42 and the circulation mechanism 43 that circulates this circulation belt 42 in the aforementioned embodiment, the pallet linear feeding unit 41, 51 is not limited to this. The pallet linear feeding unit 41, 51 may be differently configured as long as the pallet 11 can be conveyed along the straight rails 21, 31.

Further, although the pallets 11 are circulated in the counterclockwise direction along the path in the aforementioned embodiment, each pallet 11 may be conveyed in a clockwise direction, not only in the counterclockwise direction.

Further, in the aforementioned embodiment, the mounting tool 17 that mounts the work is provided on one lateral part of the mounting plate 16. However, although not shown, the mounting plate 16 may be formed with a through hole, a mounting tool may be provided in that through hole and a work may be mounted through the mounting plate 16 via this through hole.

Further, in the aforementioned embodiment, the servo motor that drives by electricity is used as the actuator 84 that rotates the arms 83. However, as long as the arms 83 can be rotated in a horizontal plane, a device that rotates the rotating rod 84b by a fluid pressure supplied to and discharged from the body portion 84a may be used as the actuator 84.

Further, in the aforementioned embodiment, the pallet curved feeding unit 81, 91 includes three arms 83 respectively radially arranged and can simultaneously move a plurality of pallets 11. However, the number of the arm(s) 83 may be one, two, four or more as long as the arm(s) 83 can convey the pallet(s) 11 along the curved rail 61, 71.

Further, in an example shown in FIG. 1, four machine tools 1 to 4 are provided on both sides of the pallet conveying apparatus 10 of the present embodiment. However, this is an example, and the number of the machine tools 1 to 4 varies depending on works to be processed and the number of the pallets 11 may be appropriately increased or decreased according to the number of the machine tools 1 to 4.

The present embodiment is summarized below.

A pallet conveying apparatus includes a pair of straight rails provided parallel to each other at a predetermined distance from each other in a horizontal direction, the pair of straight rails being configured such that an pallet is movably mounted thereon, a pallet linear feeding unit configured to convey the pallets mounted on the straight rails along the straight rails, a pair of curved rails curved to couple both end parts of the pair of straight rails, the pair of curved rails being configured such that the pallet is movably mounted thereon, and a pallet curved feeding unit configured to convey the pallets mounted on the curved rails along the curved rails.

The curved rail may be formed into a semicircular shape. In this case, the pallet curved feeding unit preferably includes an arm having a locking member on a tip, the locking member being configured to lock to the pallet, and an actuator configured to rotate the arm with a base end of the arm serving as a center of rotation. A plurality of the arms may be radially arranged.

Further, the locking member may be provided on the tip of the arm movably in a longitudinal direction of the arm. In the case of providing the pallet with a receiving member lockable to the locking member, the receiving member may be projectably and retractably provided on the pallet.

Further, a pallet conveying method guides a pallet from an end part of either one of two straight rails to an end part of other of two straight rails, the pallet moving on the one straight rail, the two straight rails being parallel to each other at a predetermined distance from each other.

Both end parts of the pair of straight rails are coupled by a pair of curved rails, and the pallet that is moved from the one straight rail to the curved rail is conveyed to the end part of the other straight rail along the curved rail.

The curved rail may be formed into a semicircular shape. In this case, preferably, the tip of the arm is locked to the pallet moved from the one straight rail to the curved rail and the pallet having the tip of the arm locked thereto is conveyed along the curved rail by rotating the arm about a base end.

In the pallet conveying apparatus and the pallet conveying method of the present embodiment, the both end parts of the pair of straight rails are coupled by the pair of curved rails and the pallet that is moved from the one straight rail to the curved rail is conveyed to the end part of the other straight rail along the curved rail by the pallet curved feeding unit.

These curved rails are provided to couple the both end parts of the pair of straight rails and are not structured to move while carrying the pallets as before.

Thus, the pallet mounted on the curved rail is stable. By stopping a movement of the pallet mounted on the curved rail, the work on the pallet can be processed. Therefore, the pallet conveying apparatus and the pallet conveying method according to the present embodiment can process even a work placed on the pallet moving from the one straight rail to the other straight rail.

Although the embodiment of the present invention has been described above, the above embodiment is merely an illustration of one exemplary application of the present invention and is not intended to limit the technical scope of the present invention to the specific configuration of the above embodiment.

The present application claims a priority based on Japanese Patent Application No. 2017-5724 filed with the Japan Patent Office on Jan. 17, 2017, and all the contents of this application are incorporated herein by reference.

The invention claimed is:

1. A pallet conveying apparatus, comprising:
a pair of straight rails provided parallel to each other at a predetermined distance from each other in a horizontal direction, the pair of straight rails being configured such that a pallet is movably mounted thereon;
a pallet linear feeding unit configured to convey the pallet mounted on the straight rails along the straight rails;
a pair of curved rails provided in a curved manner to couple both end parts of the pair of straight rails, the pair of curved rails being configured such that the pallet is movably mounted thereon; and
a pallet curved feeding unit configured to convey the pallet mounted on the curved rails along the curved rails,
wherein the pallet curved feeding unit includes:
an arm having a locking member on a tip, the locking member being configured to lock to the pallet; and
an actuator configured to rotate the arm with a base end of the arm serving as a center of rotation, and
the locking member is configured to be moved in a longitudinal direction of the arm according to the rotation of the arm.

2. The pallet conveying apparatus according to claim 1, wherein the locking member is configured to be moved in the longitudinal direction of the arm to be moved along the end parts of the straight rails according to the rotation of the arm.

3. The pallet conveying apparatus according to claim 1, wherein a plurality of the arms are radially arranged.

4. The pallet conveying apparatus according to claim 1, further comprising a receiving member projectably and retractably provided on the pallet, the receiving member being configured to lock to the locking member.

5. The pallet conveying apparatus according to claim 1, further comprising a receiving member projectably and retractably provided on the pallet, the receiving member being configured to lock to the locking member.

6. A pallet conveying method for guiding a pallet, which is moved on either one of two straight rails parallel to each other at a predetermined distance from each other, from an end part of the one of the pair of straight rails to an end part of other of the pair of straight rails, comprising:
coupling both end parts of the pair of straight rails by a pair of curved rails; and conveying the pallet, which is moved from the one of the pair of straight rails to the curved rails, to the end part of the other of the pair of straight rails along the curved rails, wherein, in conveying the pallet along the curved rails, a locking member is locked to the pallet and an arm is rotated with a base end of the arm serving as a center of rotation, the arm having the locking member on a tip, the locking member is moved in a longitudinal direction of the arm according to the rotation of the arm.

7. The pallet conveying method according to claim 6, wherein the locking member is moved in the longitudinal direction of the arm to be moved along the end parts of the straight rails according to the rotation of the arm.

* * * * *